March 3, 1942.    N. AHLMANN    2,274,948
COOLER AND CONVEYER
Filed June 8, 1939    2 Sheets-Sheet 1
Fig. 1,
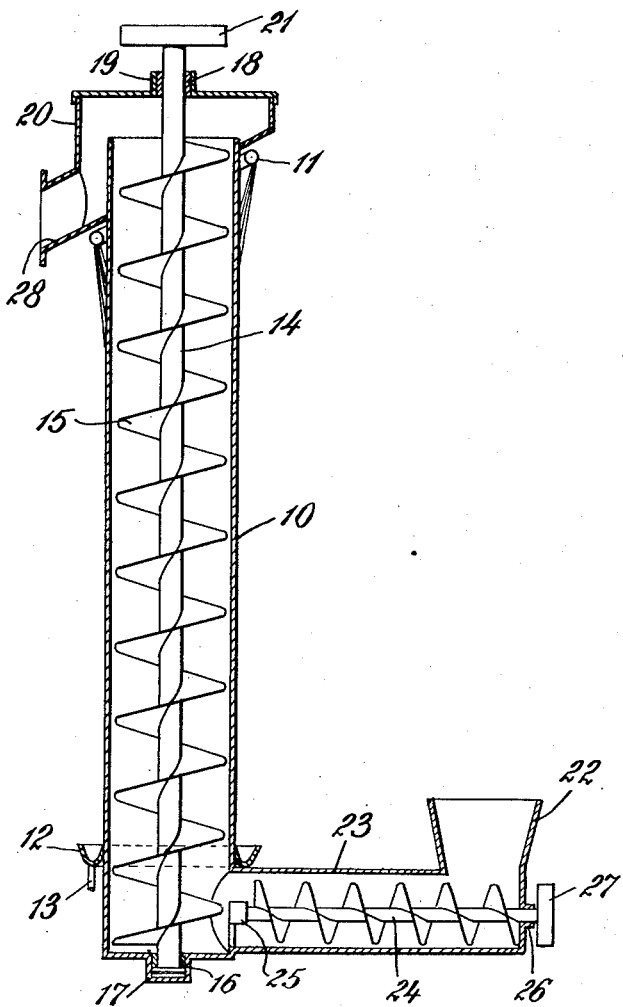
Fig. 2,
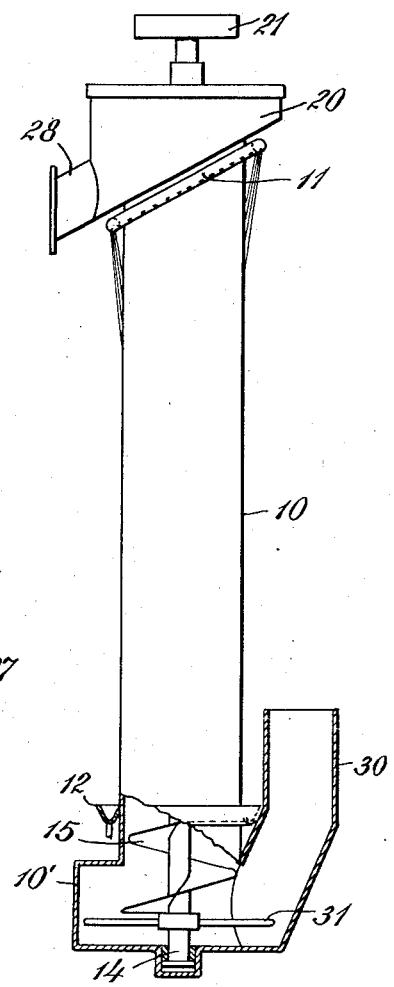
INVENTOR
Nikolai Ahlmann
BY
Pennie Davis Marvin & Edmonds
ATTORNEYS March 3, 1942.  N. AHLMANN  2,274,948
COOLER AND CONVEYER
Filed June 8, 1939  2 Sheets-Sheet 2

INVENTOR
Nikolai Ahlmann
BY
Pennie Davis Marvin & Edmonds
ATTORNEYS

Patented Mar. 3, 1942

2,274,948

UNITED STATES PATENT OFFICE 2,274,948

COOLER AND CONVEYER

Nikolai Ahlmann, Frederiksberg, near Copenhagen, Denmark, assignor to F. L. Smidth & Company, New York, N. Y., a corporation of New Jersey Application June 8, 1939, Serial No. 278,006
In Great Britain June 18, 1938

4 Claims. (Cl. 257—112)

This invention relates to the heating or cooling of pulverulent materials, such as cement, granulated ore, and the like, and is concerned more particularly with a novel method and apparatus by which such materials may be rapidly heated or cooled without loss.

Heretofore, in order to heat or cool pulverulent materials, various expendients have been employed, as for example, a current of air has been caused to sweep over the materials, or the materials have been charged in a thick layer in a container made of heat conducting material. Heat exchange is then caused to take place through the wall of the container, and in some instances, it has been the practice to stir the materials slowly while they are undergoing treatment. These prior methods are not entirely satisfactory, since they require large heat exchange surfaces, and when an air current is caused to flow over the materials, it may carry away dust, particularly if the materials are in the form of fine powder. The loss of materials in this manner may be so great in some instances as to necessitate the use of a dust precipitation plant for their recovery and this adds greatly to the cost of installation and operation of the equipment.

In my application Serial No. 79,837, filed May 15, 1936, I have disclosed a method and apparatus by which these objections to the prior procedure are overcome. In the practice of the method of that application, the material is moved in a relatively thin layer along a helical path in contact with the inner face of a container having the shape of a surface of revolution, and a medium of a temperature different from that of the material is maintained in contact with the outer face of the surface. In one form of the apparatus, the container is generally conical and is arranged vertically with the small end down. The material in the container is moved rapidly around the container axis by a set of vertical vanes so that the particles are urged centrifugally against the container wall, and by reason of the conical shape of the wall, the centrifugal force produces a vertical component which moves the material upwardly against the force of gravity to an outlet near the top. In another form, the container is cylindrical and disposed with its axis horizontal, and the material is urged along the wall by centrifugal force, the material within the container advancing under the influence of gravity toward an outlet as fresh material is supplied. Thus, in both forms of apparatus, the material is subjected only to the force applied tangentially to the inner surface of the container.

The present invention is directed to the provision of a novel method for altering the heat content of pulverulent materials, which differs from my prior method in that the material is caused to move upwardly along a helical path in contact with a container wall partly by centrifugal action but partly by a mechanical lifting force applied by the centrifugal means. The invention also comprehends a novel apparatus by which the new method may be conveniently practised.

The apparatus for use in carrying out the new method may take various forms, and each such form includes a container which may be cylindrical and has a heat conducting wall. The container stands with its axis substantially vertical and within it is a member mounted for rotation on the axis of the container and driven at a high speed. This member is provided with flight means which may take the form of a continuous screw, which may be single or multiple, or of a screw which is interrupted at intervals. The outer edge of the flight lies spaced inwardly from the wall of the container to provide a clearance substantially greater than that employed in an ordinary screw conveyer, and in the operation of the device, material introduced at the lower end of the container is elevated and thrown outwardly against the container wall. As the material escapes from one part of the flight, it is acted on by the lower parts thereof, and as a result, the material moves upward through the container along helical paths of low pitch until it is discharged at the upper end of the container. In its treatment, the material is aerated so that it is rendered fluent and the particles in the layer against the container wall move relatively to one another so that they give up heat to or receive heat from the wall. On the outer surface of the wall is applied the heat transfer medium, as, for example, cooling water when the device is used for cooling cement, etc.

For a better understanding of the invention, reference may be had to the accompanying drawings, in which—

Fig. 1 is a vertical sectional view of one form of the new apparatus;

Fig. 2 is a side view of a modified form of the apparatus, partly in elevation and partly in section;

Figure 3:
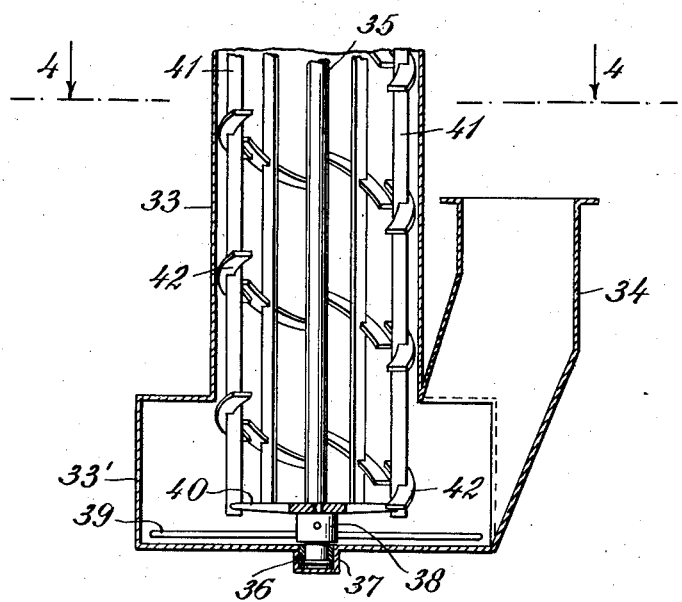
Fig. 3 is a view similar to Fig. 1 of part of another form of the apparatus.

The apparatus shown in Fig. 1 is particularly adapted for cooling hot pulverulent material and it comprises a cylindrical container 10 supported in any suitable manner in a vertical position. The container wall is made of a heat conducting material and the heat transfer medium is applied to the outside as, for example, a cooling liquid is discharged from a pipe 11 surrounding the container near the top thereof to flow down the wall and be collected in a trough 12, from which it is led away through a pipe 13.

Mounted within the container is a rotary member having flight means and in the apparatus shown, the member is a vertical screw consisting of a shaft 14 with a flight 15. The outer edge of the flight is spaced from the inner face of the container wall and the flight is arranged to operate with a lifting action as the shaft rotates. At its lower end, the shaft is supported in a bearing 16 in a recess 17 projecting from the bottom of the container, and near its upper end, the shaft passes through a bearing 18 in a flange 19 projecting up from the cover of a casing 20 into which the top of the container extends. At its upper end, the shaft carries a pulley 21 by which it may be driven from any suitable power source at a relatively high speed.

The material to be cooled is fed through a hopper 22 to a horizontal, cylindrical casing 23 leading into the lower part of the container 10. A worm 24 is mounted in the casing 23 lengthwise thereof in bearings 25 and 26, and the shaft of the worm projects through the bearing 26 outside the casing where it is provided with a driving pulley 27. The material to be treated is fed into the container 10 by the worm at a pressure sufficient to insure that the material will be picked up by the flight 15 and after passage of the material through the container, it is discharged into the casing 20, from which it passes out through an outlet 28 in the casing.

The clearance employed between the outer edge of the screw flight and the inner wall of the container depends either on the grain size of the material or on the structural requirements of the apparatus. Thus, in general, the clearance should be approximately four times the diameter of the grains. However, when the grain size is very small, as in the case of ground cement, it is not feasible to construct apparatus of this type in which the rotary member operates at high speeds with so small a clearance and a greater clearance is used so that the lower limit of clearance imposed by constructional problems is about 5 mm. or 3/16".

In the operation of the apparatus, the rotary member is driven at a high speed. For example, when the member is in the form of a screw having a flight diameter of about 14 inches and a pitch of about 6 inches, it is preferably driven at a speed of from 150 to 200 R. P. M. The material is fed into the container at a rate such that the container is kept filled to only a small fraction of its capacity.

In the container, the material is picked up by the flight and elevated and at the same time is moved around the container axis, the resulting centrifugal force urging the material outwardly against the container wall. As a result, the particles, distributed in a thin layer, move along generally helical paths of low pitch on the wall and are moved relative to each other by the edge of the flight, so that substantially all of the particles come frequently into contact with the wall and the material is uniformly and efficiently cooled. By reason of the clearance between the wall and the flight, particles continually leave the lifting influence of the flight and drop along the wall to a lower part of the flight, where they are mixed with the warmer particles and aid in the cooling thereof. Also, because of the clearance referred to, the screw may be rotated at high speed without wear between the flight and the container wall. Since the container is maintained only partly full, there is a considerable space in the central portion thereof, and the air in this space in contact with the inner face of the layer of material is beaten into and mixed with the material by the flight, so that the material is rendered more fluent and therefore made capable of being moved more readily over the container wall. By the use of the clearance between the outer edges of the screw flight and the inner wall of the container, the backward slippage of portions of the material from one part of the flight to another during the movement of the material through the container prolongs the time during which the material is subjected to heat transfer. The effect, therefore, is substantially that of increasing the length of the container and using a conveyer with a conventional clearance operated at the usual relatively low speeds. In addition, the slippage action, together with the centrifugal movement of the material as it is thrown toward the conveyer wall, produces thorough mixing of the material and insures that all particles thereof will be brought into contact with the wall. The action of the flight also serves to beat air into the pulverulent material and thus render it fluent so that it may be handled more readily in the manner described. The new apparatus is, therefore, highly effective in performing its heat transfer function.

In the new apparatus, certain conditions must be met to cause the material to move upwardly against the force of gravity and these conditions may be expressed approximately, assuming a single continuous flight, by stating that $rw^2$ should not be less than $$\frac{g}{\mu_1} \cdot \frac{\mu^2 + \tan \alpha}{1 - \mu_2 \tan \alpha}$$

where $r$ is the radius of the container, $w$ is the angular velocity of the screw, $g$ is the force of gravity acting on the material, $\alpha$ is the pitch of the screw thread, and $\mu_1$ and $\mu_2$ are the coefficients of friction between the material and the container wall and between the material and the flight, respectively. The screw, therefore, should have such dimensions and be rotated at such speed in relation to these two coefficients of friction that the above condition is satisfied. By properly proportioning the various factors enumerated above and controlling the amount and temperature of the cooling medium, the desired degree of cooling may be obtained. Thus, if the screw is made smoother so that $\mu_2$ is reduced, and the container wall is roughened so that $\mu_1$ is greater, the speed of flow of the material through the container is increased with the result that the degree of cooling is decreased.

With the new apparatus, material, such as cement, may be cooled and simultaneously lifted to a considerable height with a relatively small consumption of power. This is frequently of great advantage and makes possible a convenient construction of cement plants. If cement from a mill is to be conveyed to a silo and cooled on the way, the mill may be arranged at a height such that the material drops from it into the hopper 22. The material is then lifted and simultaneously cooled by the new apparatus and discharged from the outlet 28 to a conveyer which may be of the pneumatic type placed on the same floor as the cement mill. It is unnecessary, therefore, either to sink a pit to accommodate the conveyer or to provide any independent lifting device.

The apparatus shown in Fig. 2 is generally similar to that shown in Fig. 1 except that the casing 23 and the feed worm therein are omitted, and the material is fed into the container 10 directly through a hopper 30. The hopper preferably extends upwardly to a height such that the material therein, when the hopper is nearly full, exerts a pressure sufficient to force material into the container 10 against the centrifugal force of the moving particles near the bottom of the container. If desired, the screw 14 may be provided near its lower end with a stirrer comprising arms 31 radiating from the screw shaft, and to accommodate the stirrer, the container is enlarged at its lower portion, as shown at 10'. The stirrer rotates with the flights and acts to move fresh material into the path of the flights and also to mix the fresh material with any cooler particles which may drop to the bottom of the container between the edges of the flights and the container wall.

Figure 4:
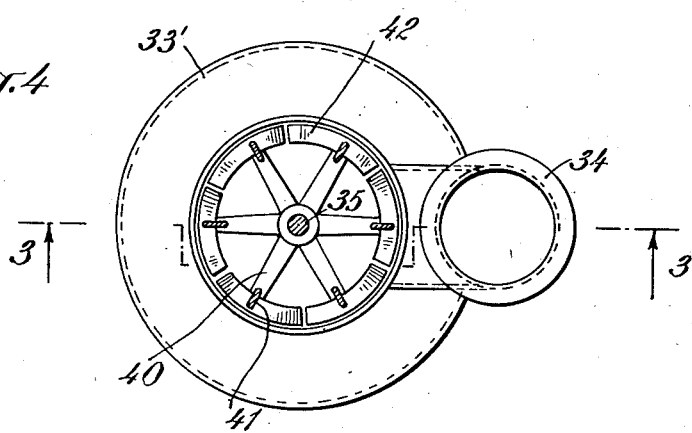
Fig. 4 is a sectional view along the line 4—4 in Fig. 3.

In Figs. 3 and 4, I have illustrated an apparatus having a rotary member of different form from that shown in Fig. 1. The apparatus, as illustrated, comprises a cylindrical casing 33 made of heat conducting material and enlarged at the bottom, as shown at 33', and the heat transfer medium is maintained in contact with the outer surface of the container wall by suitable means, as, for example, that shown in Figs. 1 and 2, although, if desired, the casing may be jacketed and the medium caused to flow through the jacket. A hopper 34 communicates with the enlarged portion 33' and acts to feed material into the container under pressure.

The rotary member comprises a vertical drive shaft 35 supported at its lower end in a bearing 36 in a projection 37 extending from the bottom of the container, and at its upper end by another suitable bearing, such as bearing 19 shown in Fig. 1. Mounted on the shaft directly above the bearing 36 is a sleeve 38 which rotates with the shaft and carries horizontal mixing arms 39 radiating therefrom. Above the sleeve 38 is a spider 40 secured to and rotatable with the shaft 35, and a similar spider, not shown, is secured to the shaft near its upper end. Vertical bars 41 are connected to the ends of the spider arms adjacent the container wall, and these bars carry flights made up of a plurality of arcuate sections 42. The central portions of the sections 42, where they are secured to the bars, lie in a substantially helical path extending upwardly from the spider 40, but each section is inclined at a steeper pitch than the pitch of this helical path. Accordingly, the upper end of each section lies above the lower end of the section immediately ahead of it, and its lower end lies below the upper end of the section behind it. Preferably, the sections are of such lengths that adjacent ends thereof overlap.

The operation of the apparatus is generally similar to that of the apparatus shown in Figs. 1 and 2. However, as the material moves upwardly along the container wall, the particles drop from the upper end of each flight section to the lower end of the section ahead of it, so that the generally helical path of the material is of flat pitch and the period during which the particles move along the wall to the outlet is prolonged. By properly adjusting the position and inclination of the sections 42, the length of the period of contact of the material with the container wall may be controlled to obtain the desired heating or cooling effect. The formula stated in connection with the apparatus shown in Fig. 1 is applicable to the construction shown in Figs. 3 and 4, provided that the sections 42 are arranged close enough to one another for the material to pass from each section to the one ahead of it.

The new apparatus employs a simple rotating device which acts both to rotate the material at high speed, and thereby move it in a thin layer along the container wall, and to exert a lifting action so that the thin layer is moved upwardly in a generally helical path. The rotating device may be driven at a high speed sufficient to subject the material to the desired centrifugal force without excessive wear on the flights, because the latter are spaced from the container wall. Since particles of the material are continually falling between the flights and the container wall and mixing with the fresher material on lower flights or at the bottom of the container, the heating or cooling of the material is efficient and thorough.

I claim:

1. An apparatus for cooling a pulverulent material, such as ground cement, granulated ore, and the like, and also elevating it, which comprises a cylindrical container having an imperforate heat conducting wall and disposed with its axis vertical, the container having an inlet near its lower end and an outlet at its top, means for conducting said material to the inlet for introduction therethrough into the container, a member mounted in the container for rotation on the container axis, a generally helical conveyer flight of relatively low pitch mounted on the member and having a plurality of convolutions within the container between the inlet and outlet, means for rotating the member at high speed, said flight operating at said speed to raise the material along a generally helical path on the inner surface of said wall and propel it centrifugally against said surface, the outer edge of said flight being so spaced from said surface as to permit downward slippage of portions of the material along the surface from one convolution of the flight to another, and means for maintaining a cooling medium in contact with the outer surface of said wall.

2. The method of cooling pulverulent materials such as ground cement, granulated ore and the like which comprises moving the material upwardly along a confining surface having the shape of a surface of revolution in a generally helical path by subjecting it to combined centrifugal and lifting actions, permitting portions of the upwardly moving particles to slip down by gravity from one convolution of said path to a lower one, said portions after such slippage being again advanced along said path, such action being repeated until the particles reach the upper end of said path, leading away material which has reached the end of said path, supplying material to the beginning of said path at such a rate in relation to the movement of said particles along said path that the material moving upwardly along said confining surface in a helical path is maintained in the form of a thin layer, and maintaining a cooling medium in heat exchange relation to said confining surface.

3. The method of cooling pulverulent materials such as ground cement, granulated ore and the like which comprises moving the material upwardly along a confining surface having the shape of a surface of revolution in a generally helical path by subjecting it to combined centrifugal and lifting actions, permitting portions of the upwardly moving particles to slip down by gravity from one convolution of said path to a lower one, said portions after such slippage being again advanced along said path, such action being repeated until the particles reach the upper end of said path, leading away material which has reached the end of said path, supplying material to the beginning of said path at such a rate in relation to the movement of said particles along said path that the material moving upwardly along said confining surface in a helical path is maintained in the form of a thin layer, maintaining a cooling medium in heat exchange relation to said confining surface, and maintaining air in contact with the inner surface of said layer.

4. The method of cooling pulverulent materials such as ground cement, granulated ore and the like which comprises moving the material upwardly along a confining surface having the shape of a surface of revolution in a generally helical path by subjecting it to combined centrifugal and lifting actions, permitting portions of the upwardly moving particles to slip down by gravity from one convolution of said path to a lower one, said portions after such slippage being again advanced along said path, such action being repeated until the particles reach the upper end of said path, leading away material which has reached the end of said path, supplying material to the beginning of said path at such a rate in relation to the movement of said particles along said path that the material moving upwardly along said confining surface in a helical path is maintained in the form of a thin layer, maintaining a cooling medium in heat exchange relation to said confining surface, and beating air into the material in its advancing and return movements along said path.

NIKOLAI AHLMANN.